Nov. 22, 1949  J. S. WALSH  2,488,949
EXHAUST VALVE
Filed Nov. 17, 1945
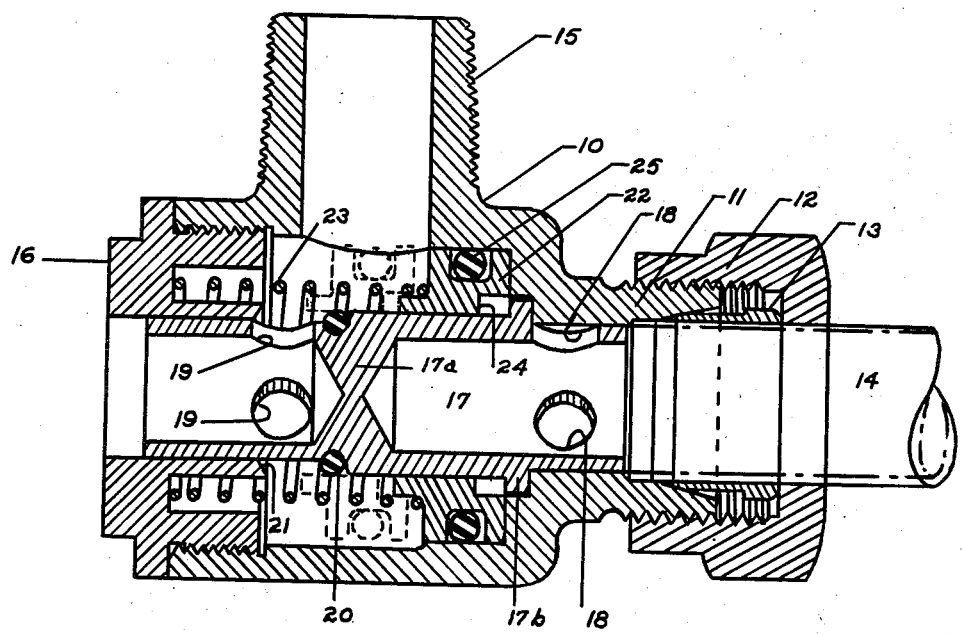
Joseph S. Walsh, INVENTOR.
BY Willard D. Eakin
Attorney Patented Nov. 22, 1949

2,488,949

UNITED STATES PATENT OFFICE 2,488,949

EXHAUST VALVE

Joseph S. Walsh, Cleveland, Ohio, assignor to The Fawick Airflex Company, Inc., a corporation of Indiana Application November 17, 1945, Serial No. 629,262

4 Claims. (Cl. 251—118)

This invention relates to quick-release valves, sometimes called "dump" valves, controlled by pressure in a pressure-fluid-supply line, for quickly venting fluid, otherwise than through the supply line, from a chamber previously charged with pressure fluid conducted into it through the supply line.

Its chief objects are simplicity, durability, reliability, economy of construction, facility of assembly and disassembly, sensitivity and quick effectiveness in a valve of this type.

Of the accompanying drawing, the single figure is an axial section of a valve embodying my invention in its preferred form.

Referring to the drawing, the valve comprises a valve casing 10 formed with a packing gland 11 and provided with a packing nut 12 and packing member 13 for connecting it to a fluid-supply pipe 14 which is elsewhere provided with means such as a three-way valve (not shown) for controlling the pressure within it.

The casing 10 is formed also with a threaded nipple 15 for connecting it to a chamber that is to be charged with pressure fluid conducted to it through the supply pipe 14 and through the valve.

The valve is adapted to vent the chamber otherwise than through the supply pipe 14 because the supply pipe may be of such length or otherwise of such low flow capacity between this valve and the pipe's pressure control valve that venting of the chamber through the supply pipe 14 would be too slow.

Slidably mounted in a small-diameter part of the casing 10 and in a spring-seat and valve-guiding annular plug 16 screwed into the end of the casing farthest from the supply-pipe 14 is a valve member 17 which is bored from opposite ends and has a partition wall 17a left between the adjacent ends of the two bores. The right-hand bore, in communication with the supply pipe 14, is in communication, through a circumferentially spaced set of slide-valve ports 18, 18, with the inner face of the small-diameter part of the casing, in association with which face the member 17 is adapted to act as a slide valve and as a piston element, being slidable, by pressure fluid in the supply pipe 14, to a position such that the parts 18 will open into a larger-diameter part of the casing.

The member 17 is formed with an external, annular stop flange 17b adapted to lie against an internal shoulder formed in the casing, at the end of its small-diameter portion, when the slide-valve ports 18 are wholly within the small-diameter portion of the casing.

The left-hand bore of the member 17, through which bore the fluid from the nipple 15 is to be vented, has leading to it a circumferentially spaced set of slide-valve ports 19, 19 formed in the wall of the member 17 and these ports are adapted to be closed by the inner face of the annular plug 16 when the member 17 is in its extreme leftward position but promptly to establish communication between the interior of the nipple 15 and the left-hand, exhaust, bore of the member 17 when the member 17 starts to move to the right.

Close to the ports 19, to the right of them, the member 17 is formed with an external, leftwardly-facing annular shoulder which merges with an annular groove at its base and in this groove and against said shoulder is mounted, and preferably cemented in place, a cross-sectionally circular, annular gasket 20, of rubber or the like, which is adapted to seat, in the manner of a poppet valve, against an annular, chamfered edge face 21 formed on the annular plug 16, the bevel of said face causing the gasket to be urged firmly against its seat on the member 17 and also effecting a tight seal between said face and the gasket.

For delaying communication beween the supply pipe 14 and the interior of the nipple 15 until after the ports 19 have been closed and the gasket 20 seated in the chamber-charging leftward movement of the valve member 17, and for urging the valve member 17 to the right for opening the quick-release exhaust when the pressure in the supply pipe 14 is lowered, a slide-valve collar 22, which serves also as a piston element, is slidably mounted on the valve member 17, is constantly urged to the right by a helical compression spring 23 interposed between it and the spring-seat and valve-guiding plug 16, and is formed with an inset annular shoulder 24 adapted to be engaged by the flange 17b of the valve member 17 in the leftward movement of the latter, lost motion between the two being provided for proper timing. The collar 22 is in effect a check-valve, as it opens a flow passage in moving in one direction and closes it in moving the other direction.

In an annular groove formed on the outer face of the collar 22 is mounted a cross-sectionally circular sealing ring 25 adapted to effect a sliding seal between the collar and the inner face of the casing 10 but, in moving to its extreme leftward position, indicated by the dotted lines, to open communication between the supply pipe 14 and the nipple 15.

Assuming the parts to be in the positions in which they are shown in full lines, with the nipple 15 vented to the atomsphere through the ports 19 and the supply pipe 14 vented to the atmosphere through its remote control valve, resetting the latter to charge the pipe 14 causes the pressure therein to move the valve member 17 quickly to its extreme leftward position, closing off the ports 19 and immediately thereafter effecting a more perfect seal of the exhaust by seating the gasket 20 against the chamfered valve-seat face 21.

At the end of this movement contact of the flange 17b with the shoulder 24 has moved the slide-valve collar 22 a little to the left and the ports 18 have opened into the large diameter part of the casing.

Thereafter pressure fluid from the supply pipe, acting against the collar 22, further compresses the spring 23 and by moving the collar to its dotted line position opens communication from the supply pipe 14 to the interior of the nipple 15, so that, with the ring 20 held seated by the fluid pressure in the right-hand bore of the member 17, the chamber to which the nipple 15 is connected is charged with pressure fluid.

When such charging is completed, the pressures on the opposite end faces of the collar 22 becoming equal, the spring 23 moves the collar 22 rightward until the sealing ring 25 closes off the nipple 15 from the supply pipe 14 and the shoulder 24 engages the flange 17b, but with such light spring pressure as not to unseat the ring 20 against the force of the fluid pressure in the supply pipe.

The collar 22 is then in position, being already sealed to the interior wall of the casing, to act immediately, under both the force of the spring and the fluid pressure within the nipple 15, to unseat the ring 20 and partially open the ports 19, upon even a moderate lowering of the pressure in the supply pipe by venting of its remote control valve. Upon further moderate decrease of pressure in the pipe 14 the pressure of fluid exhausting through the left-hand bore of the member 17 forces the latter to its extreme rightward position and thus fully opens the ports 19, so that the chamber to which the nipple 15 is connected is quickly exhausted.

Modifications are possible within the scope of the appended claims.

I claim:

1. A valve assembly comprising a valve casing having its wall formed with a supply passage, a chamber-charging passage and an exhaust passage, a valve structure mounted in sliding contact with the inner face of said casing and movable by the pressure of fluid in the supply passage to close the exhaust passage and movable in the opposite direction by preponderant effect of pressure in the chamber-charging passage over that in the supply passage for putting the chamber-charging passage in communication with the exhaust passage, said valve structure comprising an inner member slidably guided in the casing, an outer member surrounding and slidably mounted for lost-motion movement on the inner member and mated with the inner wall of the casing for full-closing valve coaction therewith, stop means limiting the movement of the outer member on the inner member in the exhaust-port-opening direction, so that further movement of the outer member in that direction compels like movement of the inner member, to open the exhaust passage subsequent to such coaction, and a spring interposed between the casing and said outer member for urging the latter in the said direction.

2. A valve assembly comprising a valve casing having its wall formed with a supply passage, a chamber-charging passage and an exhaust passage, a valve structure mounted in sliding contact with the inner face of said casing and movable by the pressure of fluid in the supply passage to close the exhaust passage and movable in the opposite direction by preponderant effect of pressure in the chamber-charging passage for putting that passage in communication with the exhaust passage, said valve structure comprising an inner member slidably guided in the casing, an outer member slidably mounted on the inner member and mounted for slide-valve coaction with the inner face of the casing, and lost-motion stop means for limiting the movement of the outer member on the inner member in the exhaust-port-opening direction, the outer member being movable in the opposite direction on the inner member by the pressure of fluid in the supply passage to open communication between that passage and the chamber-charging passage after the inner member has been stopped in its exhaust-port-closing position.

3. A valve assembly comprising a valve casing having its wall formed with a supply passage, a chamber-charging passage and an exhaust passage, and a piston structure slidably mounted in said casing, said piston structure comprising valve means thereon movable by the force of fluid pressure in the supply passage for closing off said exhaust passage from the chamber-charging passage and other valve means thereon movable by the said force for opening communication from the supply passage to the chamber-charging passage, the said piston structure also mating as a piston with the inner face of the casing and having opposite effective piston faces exposed to fluid in the chamber-charging passage and the supply passage respectively while the exhaust passage is closed, for actuation of the piston structure by preponderance of fluid pressure in the chamber-charging passage over that in the supply passage to move the first mentioned valve means for opening the chamber-charging passage to the exhaust passage.

4. A valve assembly as defined in claim 3 in which the defined piston structure comprises a check-valve for opening the supply passage to the chamber-charging passage and yielding means urging the check-valve toward closed position for closing it upon equalization of pressure in the supply passage and the chamber-charging passage.

JOSEPH S. WALSH.

REFERENCES CITED

The following references are of record in the file of this patent:

UNITED STATES PATENTS

| Number | Name | Date |
| --- | --- | --- |
| 331,789 | Harvey | Dec. 8, 1885 |
| 977,486 | Thompson | Dec. 6, 1910 |
| 1,138,278 | Castle | May 4, 1915 |
| 1,406,216 | Olson | Feb. 14, 1922 |
| 1,986,206 | Kennedy | Jan. 1, 1935 |
| 2,069,366 | Heerdt | Feb. 2, 1937 |
| 2,358,228 | Hoof | Sept. 12, 1944 |
| 2,360,839 | Barksdale | Oct. 24, 1944 |
| 2,408,799 | Melichar | Oct. 8, 1946 |
| 2,431,936 | Hudson | Dec. 2, 1947 |

FOREIGN PATENTS

| Number | Country | Date |
| --- | --- | --- |
| 502,224 | Great Britain | May 5, 1938 |